US012683874B2

(12) United States Patent (10) Patent No.: US 12,683,874 B2
Westerberg et al. (45) Date of Patent: Jul. 14, 2026

(54) INTENT BASED AUTOMATION FOR PARTITIONED RADIO SYSTEMS

(71) Applicant: Telefonaktiebolaget LM Ericsson (publ), Stockholm (SE)

(72) Inventors: Erik Westerberg, Enskede (SE); Håkan Olofsson, Stockholm (SE); Ilaria Brunelli, Prosper, TX (US); Zachary Duncan, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 163 days.

(21) Appl. No.: 18/567,166

(22) PCT Filed: Jun. 10, 2022

(86) PCT No.: PCT/EP2022/065847
§ 371 (c)(1),
(2) Date: Dec. 5, 2023

(87) PCT Pub. No.: WO2022/258813
PCT Pub. Date: Dec. 15, 2022

(65) Prior Publication Data
US 2024/0291733 A1     Aug. 29, 2024

Related U.S. Application Data

(60) Provisional application No. 63/209,193, filed on Jun. 10, 2021.

(51) Int. Cl.
*H04L 41/5009* (2022.01)
*H04W 28/24* (2009.01)

(52) U.S. Cl.
CPC ......... *H04L 41/5009* (2013.01); *H04W 28/24* (2013.01)

(58) Field of Classification Search
CPC .. H04L 41/5009; H04W 28/24; H04W 24/08; H04W 88/10; H04W 16/14
See application file for complete search history.

(56) References Cited

U.S. PATENT DOCUMENTS

2013/0301435 A1* 11/2013 Panah .................. H04B 7/0417
370/252
2017/0117955 A1* 4/2017 Chandra ............. H04W 72/543
(Continued)

FOREIGN PATENT DOCUMENTS

EP         3585101 A1     12/2019

OTHER PUBLICATIONS

International Search Report and Written Opinion dated Sep. 21, 2022 for International Application No. PCT/EP2022/065847 filed Jun. 10, 2022; consisting of 20 pages.

*Primary Examiner* — Joe Chacko
(74) *Attorney, Agent, or Firm* — Weisberg I.P. Law, P.A.

(57) ABSTRACT

A method and network node for intent based automation for partitioned radio systems are disclosed. According to one aspect, a method in a network node includes determining at least a first intent metric and a second intent metric based on performance measurements. The first intent metric indicates a quality of experience of first communication network users and the second intent metric indicates a quality of experience of second communication network users. The method also includes comparing the first and second intent metrics to respective first and second service level intents for communications of respective first and second communication networks. A service level intent may indicate a minimum service level. A radio resource partition (RRP) between the communications of the first and second communication networks is determined based at least in part on the comparison.

20 Claims, 8 Drawing Sheets

MOBILE INFRASTRUCTRE (HW & SW)
RADIO-RESOURCE FUNCTIONS AND MORE
INTERNET
FWA CONNECTIONS
MBB CONNECTIONS

(56)                    References Cited

U.S. PATENT DOCUMENTS

| | | | |
|---|---|---|---|
| 2019/0155958 A1 | 5/2019 | Lal et al. | |
| 2020/0145967 A1* | 5/2020 | Park | H04W 72/23 |
| 2021/0136838 A1 | 5/2021 | Khalid et al. | |
| 2022/0053380 A1* | 2/2022 | Krishnan | H04W 24/08 |
| 2023/0117026 A1* | 4/2023 | Gopal | H04W 12/45 |
| | | | 370/329 |

* cited by examiner

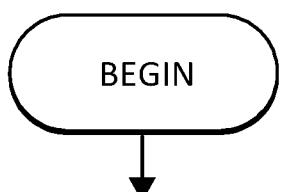

BEGIN

DETERMINE AT LEAST A FIRST INTENT METRIC AND A SECOND INTENT METRIC BASED AT LEAST IN PART ON PERFORMANCE MEASUREMENTS, THE FIRST INTENT METRIC BEING INDICATIVE OF A QUALITY OF EXPERIENCE OF USERS OF THE FIRST COMMUNICATION NETWORK AND THE SECOND INTENT METRIC BEING INDICATIVE OF A QUALITY OF EXPERIENCE OF USERS OF THE SECOND COMMUNICATION NETWORK S16

COMPARE THE FIRST INTENT METRIC AND THE SECOND INTENT METRIC TO RESPECTIVE ONES OF A FIRST SERVICE LEVEL INTENT FOR COMMUNICATIONS OF THE FIRST  COMMUNICATION NETWORK AND A SECOND SERVICE LEVEL INTENT FOR COMMUNICATIONS OF THE SECOND COMMUNICATION NETWORK, A SERVICE LEVEL INTENT INCLUDING AN INDICATION OF A MINIMUM SERVICE LEVEL S18

DETERMINE A RADIO RESOURCE PARTITION, RRP, BETWEEN THE COMMUNICATIONS OF THE FIRST COMMUNICATION NETWORK AND THE COMMUNICATIONS OF THE SECOND COMMUNICATION NETWORK BASED AT LEAST IN PART ON THE COMPARISON S20

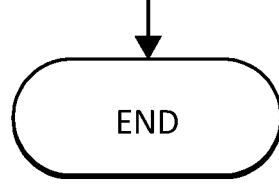

END

FIG. 7

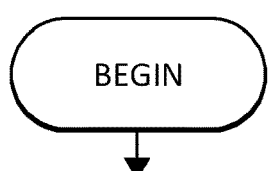

BEGIN

STORE A RADIO RESOURCE PARTITION, RRP, PARAMETER INDICATING AN ALLOCATION OF RADIO RESOURCES BETWEEN COMMUNICATIONS OF THE FIRST COMMUNICATION NETWORK USERS AND COMMUNICATIONS OF SECOND COMMUNICATION NETWORK USERS S22

RECEIVE TARGET VALUES FOR A FIRST INTENT METRIC AND A SECOND INTENT METRIC FROM A NETWORK OPERATOR, THE FIRST INTENT METRIC BEING INDICATIVE OF A QUALITY OF EXPERIENCE OF THE FIRST COMMUNICATION NETWORK USERS AND THE SECOND INTENT METRIC BEING INDICATIVE OF A QUALITY OF EXPERIENCE OF THE SECOND COMMUNICATION NETWORK USERS S24

DETERMINE A FIRST SERVICE LEVEL INTENT ASSOCIATED WITH THE FIRST INTENT METRIC AND A SECOND SERVICE LEVEL INTENT ASSOCIATED WITH THE SECOND INTENT METRIC BASED AT LEAST IN PART ON THE TARGET VALUES, A SERVICE LEVEL INTENT BEING INDICATIVE OF A MINIMUM LEVEL OF SERVICE S26

DETERMINE THE FIRST INTENT METRIC AND THE SECOND INTENT METRIC BASED AT LEAST IN PART ON PERFORMANCE MEASUREMENTS S28

DETERMINE THE RRP PARAMETER BASED AT LEAST IN PART ON A COMPARISON BETWEEN THE FIRST AND SECOND INTENT METRICS AND RESPECTIVE FIRST AND SECOND SERVICE LEVEL INTENTS S30

END

FIG. 8

INTENT BASED AUTOMATION FOR PARTITIONED RADIO SYSTEMS

CROSS-REFERENCE TO RELATED APPLICATIONS

This application is a Submission Under 35 U.S.C. § 371 for U.S. National Stage Patent Application of International Application No.: PCT/EP2022/065847, filed Jun. 10, 2022 entitled "INTENT BASED AUTOMATION FOR PARTI-TIONED RADIO SYSTEMS," which claims priority to U.S. Provisional Application No. 63/209,193, filed Jun. 10, 2021, entitled "INTENT BASED AUTOMATION FOR PARTITIONED RADIO SYSTEMS," the entireties of both of which are incorporated herein by reference.

TECHNICAL FIELD

The present disclosure relates to wireless communications, and in particular, to intent based automation for partitioned radio systems.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Standards for Sixth Generation (6G) radio systems are currently being developed.

Fixed Wireless Access

Fixed wireless access (FWA) is a broadband service where broadband Internet connectivity is delivered to a household or enterprise by radio, the broadband connectivity service being similar to a fixed wireline broadband service. The FWA service can be offered by Internet service providers to their customers as a replacement of—or complement to—a corresponding service over fiber, cable, or digital subscriber line (DSL).

With 4G and even more so with 5G, several mobile network operators (MNOs) are using their cellular networks to provide FWA to their customers. A most cost-efficient way to offer both the FWA service and a mobile broadband (MBB) service in the same geographical area is to use the same spectrum and infrastructure (towers, radios, software (SW) . . . ) for both services. An alternative is to use separate frequency resources for FWA and MBB subscribers, but this leads to higher cost due to the need for more spectrum and infrastructure.

Radio Resource Management

The cost-efficient solution of using the same spectrum and infrastructure for the FWA and MBB services means that both FWA traffic and MBB traffic will run on the same frequency carrier and thus compete for the same frequency resources. This also means that there is a risk that potentially large volumes of FWA traffic can cause congestion for the MBB traffic and vice versa. This leads to degradation of the quality of experience (QoE) for both the MBB service and the FWA service. As one example, an abnormally large influx of mobile broadband subscribers into an area could cause overload on the shared spectrum carrier which leads to congestion for the FWA service in the same area, resulting in quality impairments in the associated FWA service.

Thus, a radio resource control function is needed to control the amount of radio resources that are used for FWA traffic and MBB traffic respectively. In particular, the radio resource control function must be designed so that in times of radio congestion, enough radio resources are used for each service so as to maintain an acceptable minimum service level. A second desired feature of the radio resources control function is that when there are not enough resources to maintain a minimum acceptable service level for all users, the degradation of the service below this minimum level should happen in a controlled and predictable way, e.g., by degrading certain user categories before others. FIG. 1 illustrates a combined fixed and mobile network where the same frequency is used to simultaneously serve FWA and MBB users to provide Internet connectivity.

Existing Technology

Presently-used technology to control the radio resources in a system with both FWA and MBB users in the same geographic area consists of a set of pre-designed and rule-based radio resource control functions that determines when and how to assign radio resources to FWA users and MBB users, respectively. Typically, the radio resource control functions influence the behavior of the radio scheduler so that each user among the MBB and FWA users gets a fair share of the scheduling opportunities in a pre-determined fashion, e.g., via a round-robin scheduler or with some priorities like a weighted fair scheduler.

With existing technologies, the radio-control function distributes the radio resources among the users in a pre-designed manner. It is also known how to get a radio resource control function to operate in one of a pre-defined set of modes by setting configuration parameters. One example of existing technology is a method called radio resources partitioning (RRP) which is implemented in some radio-access network products. With the RRP method, the mobile network operator sets a configuration parameter that sets a sharing ratio between the radio resources scheduled for the MBB users and FWA users, respectively. When there is competition for radio resources between the MMB users and the FWA users, the radio scheduler operates in such a way that the radio resources are shared between the MBB users and FWA users according to the configured sharing ratio. As an example, if the sharing ratio is set to 60%, in times of congestion the MBB users have 60% of the radio resources and the FWA users share the remaining 40% of the radio resources. In this example, the scheduler will operate so that 60% of the scheduling opportunities go to MBB users and 40% of the scheduling opportunities go to FWA users. FIG. 2 shows an example of radio resource partitioning a function of time of day. When there is no competition for radio resources, the bandwidth may be shared freely between MBB and FWA users. When there is radio congestion and competition for the radio resources, the scheduler follows the RRP sharing ratio in its bandwidth allocation to the MBB and FWA users respectively.

The RRP radio resource control function is pre-designed, rule-based and configurable. The mobile network operator can configure the sharing ratio between 0% and 100%, to try to find the value that gives a system behavior that is closest to the wanted behavior.

In addition to the RRP method, there are other existing technologies for how to share the radio resources between FWA users and MBB users, e.g., various load-balancing functions and per-user quality of service prioritization functions. Some of these functions can be used in combination with the RRP function, while others act as alternatives. Common to these different technologies is pre-designed, rule-based procedures and determination of system behavior based on values of a set of function-specific technical configuration parameters.

There is a set of problems with the existing solutions. Examples of such problems may include:

1. Difficulty to configure the system to get the right service performance. It is very complex, and in some cases virtually impossible to determine how to set the configuration parameters to get the wanted behavior of the system with respect to the quality of experience of the FWA and MBB user, and is impossible to understand the way the QoE decreases when congestion increases. This makes it very difficult and costly to meet the performance expectations of the users.

2. A costly process of context-dependent and manual per-cell configuration. To get the same consistent system behavior in a geographical area with many cells, the configuration parameters need to be balanced and set differently from cell to cell. As one example, using the RRP technology, the ratio configuration parameter has to be set differently in a cell with a large fraction of FWA users than in a cell with a small fraction of FWA users. Similarly, the best setting of the configuration parameters will depend in a non-trivial way on the bandwidth targets for the FWA services, i.e., the broadband service characteristics of which an example includes a 10 Mbps service versus a 50 Mbps broadband service. This leads to a high cost to the mobile network operator as a set of configuration parameters have to be tuned per cell.

3. The system needs to be re-configured when new subscribers are added and when traffic patterns change. A third problem is that, even if a mobile network operator succeeds with (1) and can afford (2), the system will likely require retuning and reconfiguration over time. As one example, if the number of FWA subscribers in an area increases as a result of a successful marketing campaign, the ratio parameter in the RRP control function must be adjusted to reflect this change. This creates costly and complex dependencies between external events and the need for network reconfiguration.

4. System performance degradation due to conflicts between radio resource control functions. With existing technologies, a multitude of radio control functions are involved in the scheduling decisions that eventually determine the service performance to the FWA and MBB users. In many situations it is not possible to understand the effect a configuration of a first control function will have on the behavior of a second control function.

SUMMARY

Some embodiments advantageously provide methods, systems, and apparatuses for intent based automation for partitioned radio systems.

In some embodiments, intent-based management principles are applied to the problem of multiple wireless services (such as FWA and MBB services) sharing a common pool of frequency resources to mitigate one or more of the problems described above.

Intent-based management is applied to operate a mobile network, not by setting and tuning a large set of configuration parameters, but by setting measurable objectives that a mobile network may achieve (intents) and priorities between the objectives in case not all can be met simultaneously (conflict resolution). The intents (objectives) can be of the form of throughput targets for various services, energy consumption limits, bounds on packet latency between server and device, or target value for any other quantity that can be measured in the system. With the intents as operational inputs, the mobile network uses its resources and adjusts its behavior to reach the intents. The system may also predict its capability to maintain the intents over time and may signal back to the operations system when an intent can no longer be maintained, possibly also with recommendations for actions to mitigate the situation.

The way intent-based management supersedes traditional, manual, parameter-tuning management is conceptually very similar to how adaptive cruise control in modern cars supersedes traditional gear shifting, accelerating and decelerating by selective application of gas and brakes. Rather than continuously and manually shifting gears and adjusting the gas (parameter control) the adaptive cruise control receives the two objectives "wanted speed 55 mph" and "don't hit the car in front of you", with priority to the second intent in case of conflict. The car (system) will then automatically adjust gas, brakes and gearing to meet the intended speed and if needed, will use the brakes to avoid hitting the car up ahead. By analogy, rather than manually tuning handoff- and load-balancing radio access network (RAN) parameters (as two examples), with intent-based management the operations team would set performance targets and priorities to which the system will automatically tune.

In at least some embodiments, the following entities are implemented:

The "Intent" is an entity that is measurable in the system (e.g., average throughput, energy consumed, delay between action-reaction, etc.), combined with a target value for that entity (e.g., throughput no lower than 10 Mbps);

The "intent handler" is a logical entity (which may be implemented in whole or in part as software and hardware or a combination thereof) that can measure the intent variable above, and which can take actions in the system that change the measured value. An example of an intent handler can be software inside a 5G base station that in the example above can measure the average downlink throughput over the radio interface and can change the scheduling priorities to influence said average downlink throughput.

The "intent owner" or "intent owner module" is a logical entity (or hardware and/or software) that can communicate with the intent handler and set target values for the intents. Continuing the example above, the intent owner can be a software entity in a management system that communicates with the intent handler in the 5G base station to set the target value for average downlink throughput to 10 Mbps.

In some embodiments, intent-based management principles are combined with the radio resources partitioning radio control function to enable a mobile network operator to set target values for service-level characteristics of the FWA and MBB services respectively as intents. The intent handler receives these intents and sets the RRP ratio configuration parameter to adjust the bandwidth ratio assigned to FWA and MBB traffic in each cell in such a way as to best meet the intents. In some embodiments, the FWA and MBB intent handler also continuously monitors the values of the intents in each cell and over time. When updates are beneficial the intent handler re-configures the RRP ratio configuration parameter to maintain the intent values as traffic and number of users vary over time.

According to one aspect, a network node includes processing circuitry configured to determine at least a first intent metric and a second intent metric based at least in part on performance measurements, the first intent metric being indicative of a quality of experience of users of the first communication network and the second intent metric being indicative of a quality of experience of users of the second communication network. The processing circuitry is also configured to compare the first intent metric and the second intent metric to respective ones of a first service level intent for communications of the first communication network and a second service level intent for communications of the second communication network, a service level intent including an indication of a minimum service level. The processing circuitry is also configured to determine a radio resource partition, RRP, between the communications of the first communication network and the communications of the second communication network based at least in part on the comparison.

According to this aspect, in some embodiments, the first intent metric and the second intent metric are based at least in part on a data transfer rate. In some embodiments, the performance measurements are performed by a scheduler. In some embodiments, the first and second service level intents are based at least in part on target values from a network operator. In some embodiments, the process also includes transmitting an indication of available intent metrics to an intent owner module and receiving the first and second service level intents. In some embodiments, the quality of experience of users of the first communication network and the quality of experience of users of the second communication network are based at least in part on a downlink throughput for the first communication network users and the second communication network users, respectively. In some embodiments, the RRP is determined base in part on a priority intent received from an intent owner module. In some embodiments, the process also includes sending a reconfiguration signal to an RRP unit configured to change a partition between resources for communications of the first communication network and resources for communications of the second communication network. In some embodiments, a service level intent includes at least one of a throughput target, an energy consumption limit and packet latency bounds. In some embodiments, at least one of the intent metrics includes at least one of an average downlink throughput, an uplink throughput, a worst user downlink throughput and a packet latency. In some embodiments, the first communication network is a mobile broadband, MBB, communication network and the second communication network is one of a fixed wireless access, FWA, communication network and an Internet of Things, IoT, communication network.

According to another aspect, a method in a network node configured to communicate with a WD. The method includes determining at least a first intent metric and a second intent metric based at least in part on performance measurements, the first intent metric being indicative of a quality of experience of users of the first communication network and the second intent metric being indicative of a quality of experience of users of the second communication network. The method also includes comparing the first intent metric and the second intent metric to respective ones of a first service level intent for communications of the first communication network and a second service level intent for communications of the second communication network, a service level intent including an indication of a minimum service level; and determining a radio resource partition, RRP, between the communications of the first communication network and communications of the second communication network based at least in part on the comparison.

According to this aspect, in some embodiments, the first intent metric and the second intent metric are based at least in part on a data transfer rate. In some embodiments, the performance measurements are performed by a scheduler. In some embodiments, the first and second service level intents are based at least in part on target values from a network operator. In some embodiments, the method includes transmitting an indication of available intent metrics to an intent owner module and receiving the first and second service level intents. In some embodiments, the quality of experience of users of the first communication network and the quality of experience of users of the second communication network are based at least in part on a downlink throughput for the first communication network users and the second communication network users, respectively. In some embodiments, the RRP is determined base in part on a priority intent received from an intent owner module. In some embodiments, the process also includes sending a reconfiguration signal to an RRP unit configured to change a partition between resources for communications of the first communication network and resources for communications of the second communication network.

According to yet another aspect, a network node configured to communicate with wireless devices, WDs, of users of a first communication network and with WDs of users of a second communication network is provided. The network node includes memory configured to store a radio resource partition, RRP, parameter indicating an allocation of radio resources between communications of the first communication network users and communications of second communication network users. The network node also includes an intent owner module in communication with the memory and configured to: receive target values for a first intent metric and a second intent metric from a network operator, the first intent metric being indicative of a quality of experience of the first communication network users and the second intent metric being indicative of a quality of experience of the second communication network users; and determine a first service level intent associated with the first intent metric and a second service level intent associated with the second intent metric based at least in part on the target values, a service level intent being indicative of a minimum level of service. The network node also includes an intent handler module in communication with the intent owner module and configured to determine the first intent metric and the second intent metric based at least in part on performance measurements and to determine the RRP parameter based at least in part on a comparison between the first and second intent metrics and respective first and second service level intents.

According to this aspect, in some embodiments, the network node also includes a radio access network, RAN, scheduler configured to obtain the performance measurements based at least in part on at least one of a data transfer rate, a distribution of packet latencies and a packet loss rate. In some embodiments, the intent handler is further configured to adapt the RRP parameter to drive a difference between the first intent metric and the first service level intent toward zero. In some embodiments, the intent owner module is further configured to: send the first and second intent metrics to the network operator and receive corresponding target values from the network operator; and translate the target values to corresponding first and second service level intents. In some embodiments, the intent owner module is further configured to receive a priority intent from the network operator, the priority intent indicating a higher priority for one of the first communication network and the second communication network; and the intent handler is further configured to determine the RRP parameter that results in an intent metric that satisfies a service level intent for communications of the one of the first communication network and the second communication network having the higher priority. In some embodiments, the first communication network is a mobile broadband, MBB, communication network and the second communication network is one of a fixed wireless access, FWA, communication network and an Internet of Things, IoT, communication network.

According to another aspect, a method in a network node for intent based automation for partitioned radio systems is provided. The method includes storing a radio resource partition, RRP, parameter indicating an allocation of radio resources between communications of the first communication network users and communications of second communication network users. The process also includes receiving target values for a first intent metric and a second intent metric from a network operator, the first intent metric being indicative of a quality of experience of first communication network users and the second intent metric being indicative of a quality of experience of second communication network users. The process also includes determining a first service level intent associated with the first intent metric and a second service level intent associated with the second intent metric, a service level intent being indicative of a minimum level of service. The process further includes determining the first intent metric and the second intent metric based at least in part on performance measurements; and determining the RRP parameter based at least in part on a comparison between the first and second intent metrics and respective first and second service level intents.

In some embodiments, obtaining the performance measurements from a scheduler based at least in part on at least one of a data transfer rate, a distribution of packet latencies and a packet loss rate. In some embodiments, the process also includes adapting the RRP parameter to drive a difference between the first intent metric and the first service level intent toward zero. In some embodiments, the process also includes sending the first and second intent metrics to a network operator and receive corresponding target values from the network operator, translating the target values to corresponding first and second service level intents. In some embodiments, the process also includes receiving a priority intent from the network operator, the priority intent indicating a higher priority for one of the first communication network and the second communication network, determining the RRP parameter that results in an intent metric that satisfies a service level intent for communications of the one of the first communication network and the second communication network having the higher priority. In some embodiments, the first communication network is a mobile broadband, MBB, communication network and the second communication network is one of a fixed wireless access, FWA, communication network and an Internet of Things, IoT, communication network.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart of another example process in a network node for intent based automation for partitioned radio systems according to some embodiments of the present disclosure; and FIG. 8 is a flowchart of yet another example process in a network node for intent based automation for partitioned radio systems according to some embodiments of the present disclosure.

DETAILED DESCRIPTION

Figure 1:
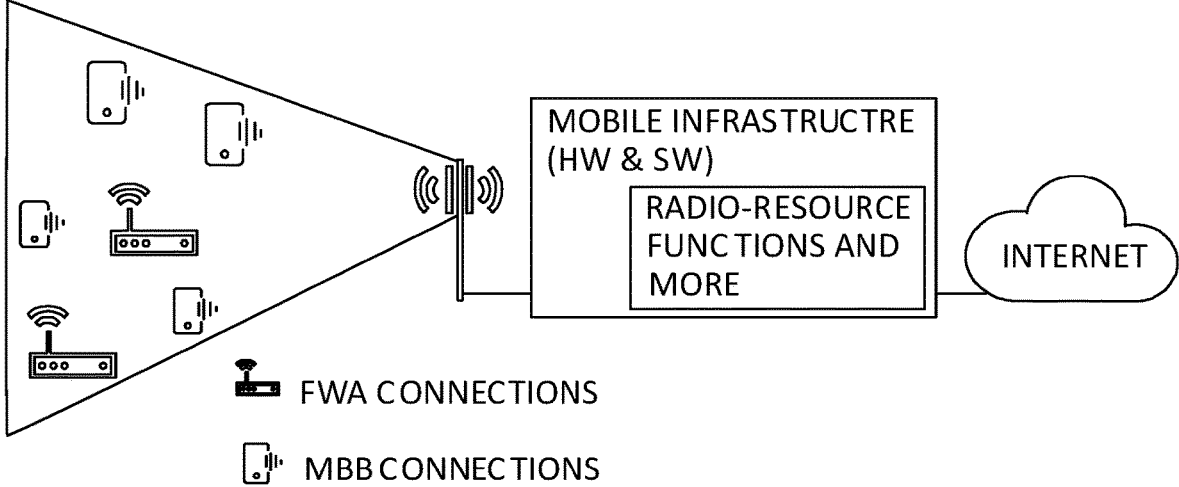
FIG. 1 illustrates a conventional combined FWA and MBB access configuration.
Figure 2:
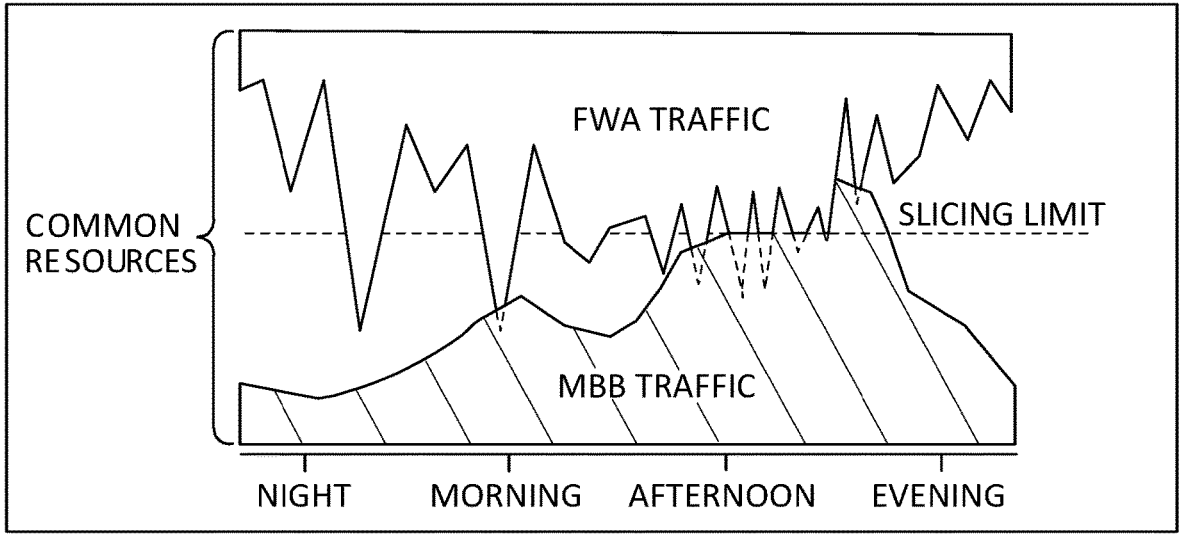
FIG. 2 illustrates overlapping resources for FWA and MBB traffic as a function of time of day.

Before describing in detail example embodiments, it is noted that the embodiments reside primarily in combinations of apparatus components and processing steps related to intent based automation for partitioned radio systems.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc. Thus, the WD can be a mobile broadband (MBB) device, a fixed wireless access (FWA) device or an IoT device.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH). A network node may be a radio base station in a single location or the functions of the network node may be distributed among a radio base station serving one or more geographical areas or cells and one or more remote nodes. A network node may have functionality to communicate with one or more other network nodes, a terrestrial network, and/or one or more satellites.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Wi-Fi, Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments described herein solve one or more of the problems described above while reducing the cost for a mobile network operator when offering two different wireless services such as an MBB service and an FWA service, for example, over the same frequency carrier in same geographical area. Some embodiments eliminate the need for costly per-cell configuration parameter tuning. Cost is also reduced by not having to manually re-configure the radio resource control configuration parameters over time. A second advantage to the mobile network operator is that the service levels of the wireless services are predictable, easily provided and automatically maintained by the system. Yet another advantage is that the time to market for a FWA service in a new area is reduced as no pre-analysis is required to configure the system. Further, the risk for bad performance due to unforeseen conflicts between pre-designed and rule-based radio resource control functions is reduced.

Some embodiments solve one or more the problems above as follows:

1. Difficulty to configure the system to get the right service performance. Rather than configure the system parameters, the mobile network operator sets the desired service levels such as minimum average throughput directly and the system tunes its performance to these intent values.

2. A costly process of context-dependent and manual per-cell configuration. In some embodiments disclosed herein the same intent-values may be used for all cells.

3. The system needs to be re-configured when new subscribers are added and when traffic patterns change. In some embodiments, once the intents are given to the system, the intent handler may automatically adjust the RRP parameter to meet the intents. Also, when circumstances such as number of subscribers change, an intent handler may adjust the RRP to meet the intents.

4. System performance degradation due to conflicts between radio resource control functions. In some embodiments, an intent handler employs artificial intelligence (AI) (also referred to as machine learning (ML) to learn about conflicts between different resource control functions and to mitigate or avoid these conflicts. In the case of unavoidable conflicts, the intent handler may resolve the conflicts based on priorities provided by the intent owner module.

Figure 3:
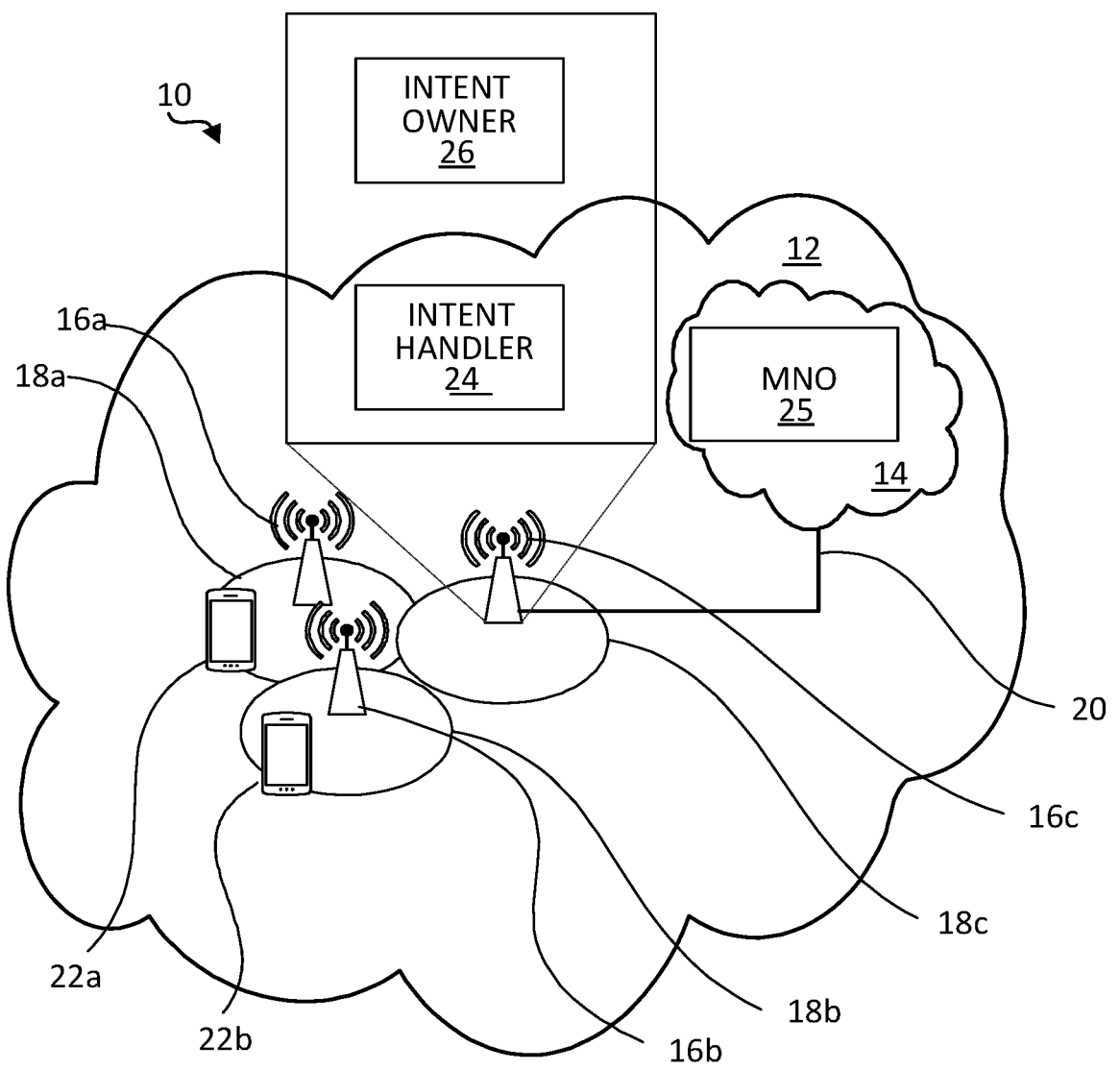
FIG. 3 is a schematic diagram of an example network architecture illustrating a communication system according to principles disclosed herein.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16. Note further that in some embodiments WDs 22 may be FWA devices and/or MBB devices. Further, FWA devices may be in the same or different cells as MBB devices. An example of an FWA device is a consumer premises equipment (CPE) and an example of a MBB device is a smartphone.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 (eNB or gNB) may be configured to include an intent handler 24 which is configured to adjust or cause adjustment of a partition of radio resources between a first access group of WDs and a second access group of WDs based on whether a monitored intent metric exceeds or falls below a corresponding target value. The network node 16 may be configured to include an intent owner module 26 which is configured to receive target values for a first intent metric and a second intent metric from a network operator, the first intent metric being indicative of a quality of experience of the first communication network users and the second intent metric being indicative of a quality of experience of the second communication network users; and determine a first service level intent associated with the first intent metric and a second service level intent associated with the second intent metric based at least in part on the target values, a service level intent being indicative of a minimum level of service. In some embodiments, a mobile network operator (MNO) returns target values for the intent metric that reflect the service level objectives for the MBB and FWA services (or other wireless services), respectively.

Example implementations, in accordance with an embodiment, of the WD 22 and network node 16 discussed in the preceding paragraphs will now be described with reference to FIG. 4.

The communication system 10 includes a network node 16 provided in a communication system 10 and including hardware 28 enabling it to communicate with the WD 22. The hardware 28 may include a radio interface 30 for setting up and maintaining at least a wireless connection 32 with a WD 22 located in a coverage area 18 served by the network node 16. The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16. For example, processing circuitry 36 of the network node 16 may include the intent handler 24 which is configured to adjust or cause to be adjusted a partition of radio resources between a first access group of WDs and a second access group of WDs based on whether a monitored intent metric exceeds or falls below a corresponding target value. The processing circuitry 36 of the network node 16 may include the intent owner module 26 which is configured to receive target values for a first intent metric and a second intent metric from a network operator, the first intent metric being indicative of a quality of experience of the first communication network users and the second intent metric being indicative of a quality of experience of the second communication network users; and determine a first service level intent associated with the first intent metric and a second service level intent associated with the second intent metric based at least in part on the target values, a service level intent being indicative of a minimum level of service.

The network node 16 may be in communication with a mobile network operator (MNO) 25. The MNO 25 may in some embodiments included within or at the network node 16. The MNO 25 returns target values for an intent metric that reflect the service level objectives for the MBB and FWA services (or other wireless services), respectively. The communication system 10 further includes the WD 22 already referred to. The WD 22 may have hardware 44 that may include a radio interface 46 configured to set up and maintain a wireless connection 32 with a network node 16 serving a coverage area 18 in which the WD 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22.

Figure 4:
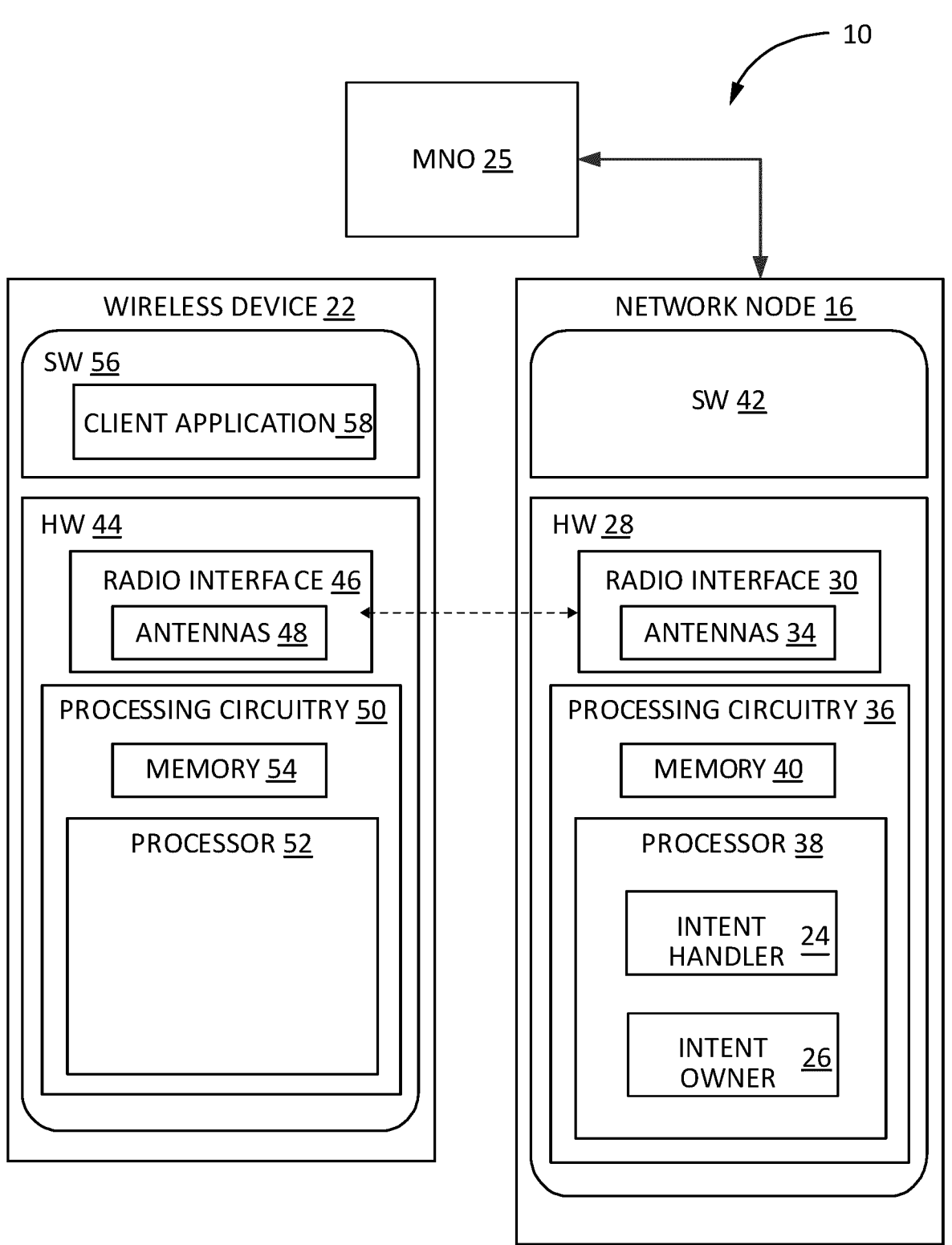
FIG. 4 is a block diagram of a network node in communication with a wireless device over a wireless connection according to some embodiments of the present disclosure.

In some embodiments, the inner workings of the network node 16 and WD 22 may be as shown in FIG. 4 and independently, the surrounding network topology may be that of FIG. 3.

The wireless connection 32 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 3 and 4 show various "units" such as the intent handler 24 and intent owner module 26 as being within the processor 38, it is contemplated that these units may be implemented such that a portion of the unit is stored in a corresponding memory 40 within the processing circuitry 36. In other words, the units may be implemented in hardware or in a combination of hardware and software within the processing circuitry 36.

Figure 5:
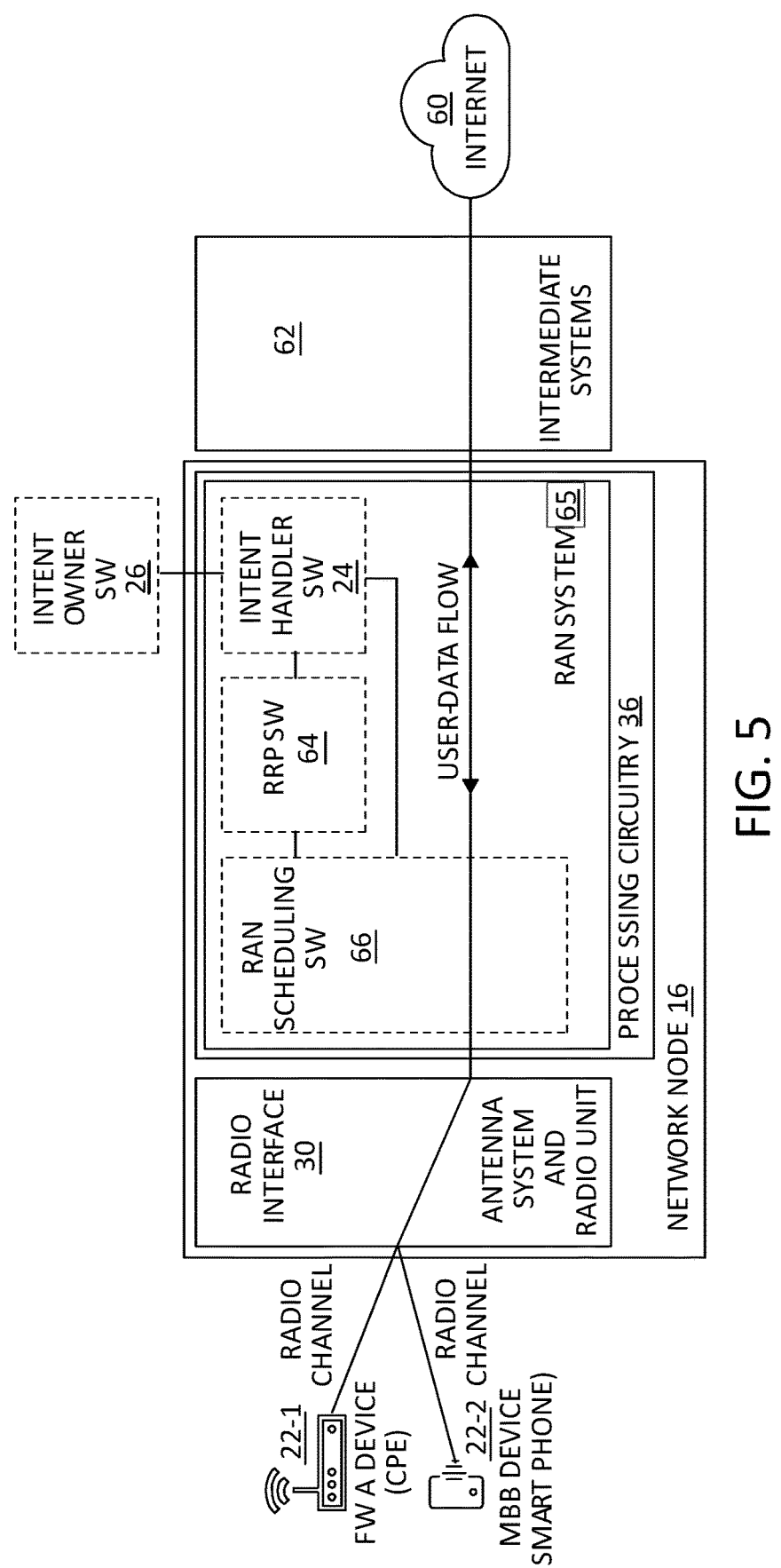
FIG. 5 is a block diagram of a network node in communication with FWA and MBB users.

FIG. 5 is a more detailed block diagram of the network node 16 showing intent handling. Connectivity between the Internet 60 and FWA WDs 22-1 and MBB WDs 22-2 is provided via the network node 16 and any intermediate systems 62. The network node 16 includes the radio interface 30 which provides radio communications between the WDs 22-1 and 22-2 and the network node 16. The network node also includes the processing circuitry 36 which may include the intent handler 24, intent owner module 26, an RRP module 64 and an RAN scheduling module 66. Note that in some embodiments, the functionality attributed to RRP module 64 and RAN scheduling module 66 may be implemented in whole or in part in hardware. The functionality of the modules 24, 64 and 66, as well as the functionality of the intent owner module 26, is described below.

Figure 6:
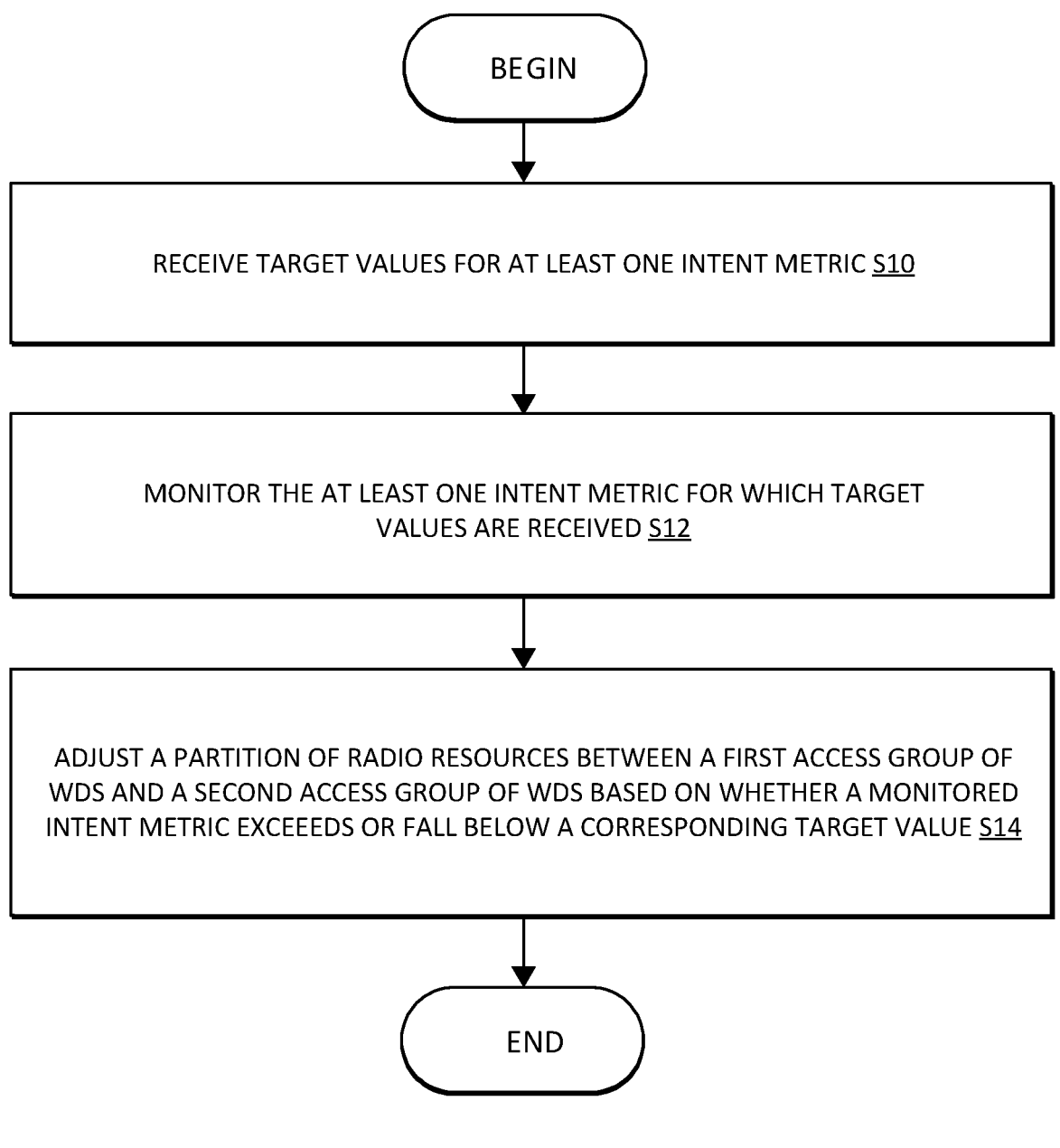
FIG. 6 is a flowchart of an example process in a network node for intent based automation for partitioned radio systems according to some embodiments of the present disclosure.

FIG. 6 is a flowchart of an example process in a network node 16 for intent based automation for partitioned radio systems. One or more blocks described herein may be performed by one or more elements of network node 16 such as by one or more of processing circuitry 36 (including the intent handler 24 and/or intent owner 26 modules), processor 38, and/or radio interface 30. Network node 16 such as via processing circuitry 36 and/or processor 38 and/or radio interface 30 is configured to receive target values for at least one intent metric (Block S10). The process also includes monitoring the at least one intent metric for which target values are received (Block S12). The process also includes adjusting a partition of radio resources between a first access group of WDs and a second access group of WDs based on whether a monitored intent metric exceeds or falls below a corresponding target value (Block S14).

FIG. 7 is a flowchart of an example process in a network node 16 for intent based automation for partitioned radio systems. One or more blocks described herein may be performed by one or more elements of network node 16 such as by one or more of processing circuitry 36 (including the intent handler 24), processor 38, and/or radio interface 30. Network node 16 such as via processing circuitry 36 and/or processor 38 and/or radio interface 30 is configured to determine at least a first intent metric and a second intent metric based at least in part on performance measurements, the first intent metric being indicative of a quality of experience of users of the first communication network and the second intent metric being indicative of a quality of experience of users of the second communication network (Block S16). The process also includes comparing the first intent metric and the second intent metric to respective ones of a first service level intent for communications of the first communication network and a second service level intent for communications of the second communication network, a service level intent including an indication of a minimum service level (Block S18). The process also includes determining a radio resource partition, RRP, between the communications of the first communication network and the communications of the second communication network based at least in part on the comparison (Block S20).

In some embodiments, the first intent metric and the second intent metric are based at least in part on a data transfer rate. In some embodiments, the performance measurements are performed by a scheduler. In some embodiments, the first and second service level intents are based at least in part on target values from a network operator. In some embodiments, the process also includes transmitting an indication of available intent metrics to an intent owner module and receiving the first and second service level intents. In some embodiments, the quality of experience of users of the first communication network and the quality of experience of users of the second communication network are based at least in part on a downlink throughput for the first communication network users and the second communication network users, respectively. In some embodiments, the RRP is determined base in part on a priority intent received from an intent owner module. In some embodiments, the process also includes sending a reconfiguration signal to an RRP unit configured to change a partition between resources for communications of the first communication network and resources for communications of the second communication network. In some embodiments, a service level intent includes at least one of a throughput target, an energy consumption limit and packet latency bounds. In some embodiments, at least one of the intent metrics includes at least one of an average downlink throughput, an uplink throughput, a worst user downlink throughput and a packet latency. In some embodiments, the first communication network is a mobile broadband, MBB, communication network and the second communication network is one of a fixed wireless access, FWA, communication network and an Internet of Things, IoT, communication network.

FIG. 8 is a flowchart of an example process in a network node 16 for intent based automation for partitioned radio systems. One or more blocks described herein may be performed by one or more elements of network node 16 such as by one or more of processing circuitry 36 (including the intent handler 24), processor 38, and/or radio interface 30. Network node 16 such as via processing circuitry 36 and/or processor 38 and/or radio interface 30 is configured to store a radio resource partition, RRP, parameter indicating an allocation of radio resources between communications of the first communication network users and communications of second communication network users (Block S22). The process also includes receiving target values for a first intent metric and a second intent metric from a network operator, the first intent metric being indicative of a quality of experience of first communication network users and the second intent metric being indicative of a quality of experience of second communication network users (Block S24). The process also includes determining a first service level intent associated with the first intent metric and a second service level intent associated with the second intent metric, a service level intent being indicative of a minimum level of service (Block S26). The process further includes determining the first intent metric and the second intent metric based at least in part on performance measurements (Block S28); and determining the RRP parameter based at least in part on a comparison between the first and second intent metrics and respective first and second service level intents (Block S30).

In some embodiments, obtaining the performance measurements from a scheduler based at least in part on at least one of a data transfer rate, a distribution of packet latencies and a packet loss rate. In some embodiments, the process also includes adapting the RRP parameter to drive a difference between the first intent metric and the first service level intent toward zero. In some embodiments, the process also includes sending the first and second intent metrics to a network operator and receive corresponding target values from the network operator, translating the target values to corresponding first and second service level intents. In some embodiments, the process also includes receiving a priority intent from the network operator, the priority intent indicating a higher priority for one of the first communication network and the second communication network, determining the RRP parameter that results in an intent metric that satisfies a service level intent for communications of the one of the first communication network and the second communication network having the higher priority. In some embodiments, the first communication network is a mobile broadband, MBB, communication network and the second communication network is one of a fixed wireless access, FWA, communication network and an Internet of Things, IoT, communication network.

Having described the general process flow of arrangements of the disclosure and having provided examples of hardware and software arrangements for implementing the processes and functions of the disclosure, the sections below provide details and examples of arrangements for intent based automation for partitioned radio systems.

In some embodiments, the system includes a cellular radio network—e.g., a 4G, 5G or 6G 3GPP-based cellular network—providing radio coverage over a geographic area (i.e., a coverage area 18). The cellular radio network includes a radio interface 30 including radio unit and a plurality of antenna systems. The cellular radio network may include radio-access network hardware and software which may be implemented by the RAN system 65. In the geographic area 18 there may be a plurality of at least two types of users, here called FWA users 22-1 and MBB users 22-2. But the methods and network nodes 16 disclosed herein are not limited to these two types of wireless services. For example, the two types of wireless services may be MBB and IoT services. The mobile broadband users 22-2 may have a radio communication device and a subscription suitable for a cellular mobile broadband service, e.g., a 3GPP User Equipment Smartphone with a subscriber identification module (SIM) card representing a traditional mobile data plan subscription. The FWA users 22-1 may have a radio communication device and a subscription suitable for a stationary broadband access service, e.g., a 3GPP Customer Premise Equipment (CPE) with a SIM card associated with a stationary broadband access service that can include, for example, Internet access and a television service.

In some embodiments, the cellular radio network may be configured into cells where each cell may be assigned at least one radio carrier which may be used for radio communication between the radio devices (the smartphones 22-2 and the CPEs 22-1 in FIG. 5) in the cell and the cellular network infrastructure (radio units and antenna systems as implemented by the radio interface 30, and RAN hardware (HW) and software (SW)) as implemented by processing circuitry 36, the SW being stored in the memory 40. Note that modules or components named herein as SW entities, such as intent handler 24, RRP 64 and RAN scheduler 66, could be implemented in hardware, in whole or in part.

The processing circuitry 36 includes a SW entity called an intent owner module 26 which may be located outside the RAN system that includes the network node 16, but with a communication channel to the RAN system. Note that a RAN system may include a plurality of network nodes 16. Accordingly, some of the functions herein attributed to a single network node 16 may actually be distributed among a plurality of network nodes 16. The intent handler 24 in some embodiments, may be part of the RAN SW stored in the memory 40 and executed by the processor 38. The RRP module 64 and the RAN scheduling module 66, may both be part of the RAN SW stored in the memory 40 and executed by the processor 38. Also, although the radio interface 30 is shown in FIG. 5 as being part of the same network node 16 as the network node that performs the RAN/RRP SW functions of modules 24, 64 and 66, it is noted that the radio interface 30 and the modules 24, 64 and 66 may be implemented in separate network nodes 16.

In some embodiments, one or more of the following steps may be performed in which the specific values discussed are provided only as non-limiting examples for ease of understanding and not as the sole values:

1. The RAN scheduling module 66 may consistently measure a set of performance indicators such as bytes transferred per wireless device 22 per unit of time for both the uplink and the downlink. Performance indicators may include a distribution of packet latencies through the RAN system, the number of lost packets per time period per device, and any other performance indicator that can be extracted from the knowledge about which packet data unit (PDU) was successfully transferred to each device and at what time.

2. The measurements of the performance indicators may then be communicated from the RAN scheduling module 66 to the intent handler 24. The intent handler 24 then uses the measurements to form a set of intent metrics, of which at least one reflects the quality of experience (QoE) of the MBB users 22-2, and at least one reflects the QoE of the FWA users 22-1. In some embodiments, the intent metric for the MBB users 22-2 can be the downlink throughput for each MBB user 22-2. The downlink throughput may be defined as a ratio of data transferred to a relevant transfer time measure, the ratio being averaged over all MBB users 22-2. A similar intent metric can be formed for the FWA users 22-1.

3. The intent handler 24 may then signal to the intent owner module 26 which intent metric the intent handler 24 supports and can measure. In this example, the two intent metrics "MBB user downlink throughput" and "FWA user downlink throughput," or any other intent metric that the intent handler 24 may be designed to calculate based on measurements from the RAN scheduling module 66, may be indicated as being supported.

4. The intent owner module 26 may then indicate the intent metric to the mobile network operator (MNO) 25 (e.g., to the MNOs business support systems, or to the MNO's staff). The MNO 25 may typically be located in a location that is different from a location of a network node 16, but may be collocated with a network node 16 in some embodiments. The MNO 25 may be configured to return target values for the intent metric that reflect the service level objectives for the MBB and FWA services. For example, an intent may be "MBB user downlink throughput no less than 2 Mbps" and "FWA user downlink throughput no less than 10 Mbps". In addition, the MNO 25 may input to the intent owner module 26, a "Priority Intent" which describes which of the two intents "MBB user downlink throughput no less than 2 Mbps" and "FWA user downlink throughput no less than 10 Mbps" has priority in case both intents cannot be reached at a time and/or place.

5. The intent owner module 26 may now have three Intents: the service level intent for MBB (no less than 2 Mbps), the service level intent for FWA (no less than 10 Mbps) and the priority intent (e.g., FWA service level intent has priority over the MBB service level intent).

6. The intent owner module 26 may signal the three intents (metric and values) to the intent handler 24. The intent handler 24 stores the intents and continues to measure the actual values of the associated service level intents based on the real-time measurements communicated to the intent handler 24 from the RAN scheduling module 66. As long as both the service level intents are fulfilled, (i.e., the measured intent values are above the target intent levels of 2 Mbps and 10 Mbps, respectively), the intent handler 24 may take no action.

7. If and when the intent handler 24 measures a value of any of the service level intents and detects that the value is below the target values, the intent handler 24 may take actions that are expected to restore the measured service level intent values to be within the desired range as given by the intents targets as communicated in step (6).

8. If the intent handler 24 concludes that a shift in the RRP ratio—e.g., in a situation where the MBB intent value is well above the target 2 Mbps but the FWA Intent value is slightly below the target 10 Mbps—the intent handler 24 may provide more bandwidth to one service at the expense of decreasing the bandwidth to the second service. Thus, the intent handler 24 may send a re-configuration signal to the RRP module 64. The re-configuration signal may contain the new configuration value for the RRP ratio, e.g., changing that ratio from 60% to 70%.

9. The RRP module 64 may receive the re-configuration signal from the intent handler 24 and store the new ratio value as its present configuration and start operating according to the new RRP ratio. In particular, this means that the RRP module 64 signals the new RRP ratio to the RAN scheduling module 66, thereby triggering the RAN scheduling module 66 to adjust the radio resource scheduling to be consistent with the new RRP ratio.

10. In situations where the intent handler concludes that any adjustment of the RRP ratio would lead to one of the two service intent metrics being fulfilled but not both simultaneously, the intent handler may use the priority intent signaled from the intent owner module 26 in step (4) to choose the adjustment of the RRP ratio that leads to fulfillment of the prioritized service intent.

Thus, in some embodiments, the MNO 25 uses intents to steer behavior of the system (steps 1 to 4) rather than as in existing technologies to tune the RAN configuration parameters. Also, the intent owner module 26 may read the available intent metrics from the intent handler 24 and communicate the target values for said intent metrics. The intent handler 24 may define and monitor the intent metrics, store the target values of intent metrics and steer the RAN system to fulfil the target intent metric values. The intent handler 24 may be configured in such a way that it can use control signals and parameter configuration signals from or to other parts of the RAN control elements, 64 and 66, for example. In some embodiments, the intent handler 24 may implement a traditional rule-based arrangement that may be configured to adjust the RRP ratio up and down depending on the measured values of the intent metrics for FWA and MBB. In some embodiments, the intent handler 24 may contain an artificial intelligence/machine learning (AI/ML) model that has been trained to adjust the RRP ratio based not only on intent metric values, but also contextual information such as number of subscribers of each type, radio-link quality and more.

Thus, some embodiments provide application of the principles of intent-based automation to the problem of providing simultaneous wireless services (e.g., MBB and FWA) on the same radio carrier, which may reduce the cost to the MNO for providing an FWA service over an existing MBB network. Some embodiments automatically and dynamically adjust the system behavior in such a way that service levels for both MBB and FWA users are maintained and a predictable prioritization of these access methods is provided when there is overload or congestion.

Intents may be based on throughput metrics derived from measurements in the RAN scheduling module 66, which measurements may be made on the radio link control (RLC)/medium access control (MAC) protocol level.

Some embodiments may include one or more of the following features:

The intent-based automation may be combined with a plurality of RAN features in addition to RRP, e.g., quality of service, inter-carrier load balancing, and quality of service/bearer prioritization features.

The intent handler 24 may be realized as an O-RAN rAPP SW module.

The intent metric may be other than average DL throughput, e.g., UL throughput, worst-user DL throughput, packet latency and more;

Support for the MBB and FWA services, e.g., a third service such as Cloud Gaming or connected cars.

Application to a wireless communication system that conforms to a standard promulgated by the Institute of Electrical and Electronics Engineers (IEEE) such as Wi-Fi.

According to one aspect, network node 16 is configured to communicate with a wireless device (WD) 22. The network node 16 includes a radio interface 30 and/or comprising processing circuitry 36 configured to: receive target values for at least one intent metric, monitor the at least one intent metric for which target values are received, and adjust a partition of radio resources between a first access group of WDs and a second access group of WDs based on whether a monitored intent metric exceeds or falls below a corresponding target value.

According to this aspect, in some embodiments, a target value includes a target throughput value for each of the first and second access groups that is not to be exceeded by a monitored throughput for each of the first and second access groups. In some embodiments, the first access group consist of fixed wireless access, FWA, devices and the second group consists of mobile broadband, MBB, devices. In some embodiments, artificial intelligence circuitry and/or software is included that is trained to adjust the partition based on intent metric values and on at least one of a number of subscribers in each of the first and second access groups, and radio link quality. In some embodiments, an indication of available metrics and wherein the received target values correspond to the indicated available metrics is transmitted to an intent owner. In some embodiments, scheduling of packets to WDs in each of the first and second access groups is adjusted based on the adjusted partition. In some embodiments, the target values of intent metrics includes a priority between the first and second access groups. In some embodiments, the monitored intent metrics are indicative of a quality of experience, QoE, of WDs in at least one of the first and second access groups.

According to another aspect, a method implemented in a network node that is configured to communicate with a wireless device is provided. The method includes receiving target values for at least one intent metric and monitoring the at least one intent metric for which target values are received. The method also includes adjusting a partition of radio resources between a first access group of WDs and a second access group of WDs based on whether a monitored intent metric exceeds or falls below a corresponding target value.

According to this aspect, in some embodiments, a target value includes a target throughput value for each of the first and second access groups that is not to be exceeded by a monitored throughput for each of the first and second access groups. In some embodiments, the first access group consist of fixed wireless access, FWA, devices and the second group consists of mobile broadband, MBB, devices. In some embodiments, the method also includes performing artificial intelligence using circuitry trained to adjust the partition based on intent metric values and on at least one of a number of subscribers in each of the first and second access groups, and radio link quality. In some embodiments, the method also includes transmitting to an intent owner an indication of available metrics and wherein the received target values correspond to the indicated available metrics. In some embodiments, the method also includes adjusting scheduling of packets to WDs in each of the first and second access groups based on the adjusted partition. In some embodiments, the target values of intent metrics includes a priority between the first and second access groups. In some embodiments, the monitored intent metrics are indicative of a quality of experience, QoE, of WDs in at least one of the first and second access groups.

Some embodiments may include one or more of the following:

Embodiment A1. A network node configured to communicate with a wireless device (WD), the network node configured to, and/or comprising a radio interface and/or comprising processing circuitry configured to:

receive target values for at least one intent metric;

monitor the at least one intent metric for which target values are received; and adjust a partition of radio resources between a first access group of WDs and a second access group of WDs based on whether a monitored intent metric exceeds or falls below a corresponding target value.

Embodiment A2. The network node of Embodiment A1, wherein a target value includes a target throughput value for each of the first and second access groups that is not to be exceeded by a monitored throughput for each of the first and second access groups.

Embodiment A3. The network node of any of Embodiments A1 and A2, wherein the first access group consist of fixed wireless access, FWA, devices and the second group consists of mobile broadband, MBB, devices.

Embodiment A4. The network node of any of Embodiments A1-A3, wherein the network node, radio interface and or processing circuitry further includes artificial intelligence circuitry and/or software that is trained to adjust the partition based on intent metric values and on at least one of a number of subscribers in each of the first and second access groups, and radio link quality.

Embodiment A5. The network node of any of Embodiments A1-A4, wherein the network node, radio interface and/or processing circuitry is further configured to transmit to an intent owner an indication of available metrics and wherein the received target values correspond to the indicated available metrics.

Embodiment A6. The network node of any of Embodiments A1-A5, wherein the network node, radio interface and/or processing circuitry is further configured to adjust scheduling of packets to WDs in each of the first and second access groups based on the adjusted partition.

Embodiment A7. The network node of any of Embodiments A1-A6, wherein the target values of intent metrics includes a priority between the first and second access groups.

Embodiment A8. The network node of any of Embodiments A1-A7, wherein the monitored intent metrics are indicative of a quality of experience, QoE, of WDs in at least one of the first and second access groups.

Embodiment B1. A method implemented in a network node that is configured to communicate with a wireless device, the method comprising:

receiving target values for at least one intent metric;

monitoring the at least one intent metric for which target values are received;

adjusting a partition of radio resources between a first access group of WDs and a second access group of WDs based on whether a monitored intent metric exceeds or falls below a corresponding target value.

Embodiment B2. The method of Embodiment B1, wherein a target value includes a target throughput value for each of the first and second access groups that is not to be exceeded by a monitored throughput for each of the first and second access groups.

Embodiment B3. The method of any of Embodiments B1 and B2, wherein the first access group consist of fixed wireless access, FWA, devices and the second group consists of mobile broadband, MBB, devices.

Embodiment B4. The method of any of Embodiments B1-B3, further comprising performing artificial intelligence using circuitry trained to adjust the partition based on intent metric values and on at least one of a number of subscribers in each of the first and second access groups, and radio link quality.

Embodiment B5. The method of any of Embodiments B1-B4, further comprising transmitting to an intent owner an indication of available metrics and wherein the received target values correspond to the indicated available metrics.

Embodiment B6. The method of any of Embodiments B1-B5, further comprising adjusting scheduling of packets to WDs in each of the first and second access groups based on the adjusted partition.

Embodiment B7. The method of any of Embodiments B1-B6, wherein the target values of intent metrics includes a priority between the first and second access groups.

Embodiment B8. The method of any of Embodiments B1-B7, wherein the monitored intent metrics are indicative of a quality of experience, QoE, of WDs in at least one of the first and second access groups.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a plurality of wireless devices, WD, of users of a first communication network and with WDs of users of a second communication network, the network node comprising processing circuitry configured to:

determine at least a first intent metric and a second intent metric based at least in part on performance measurements, the first intent metric being indicative of a quality of experience of users of the first communication network and the second intent metric being indicative of a quality of experience of users of the second communication network;

compare the first intent metric and the second intent metric to respective ones of a first service level intent for communications of the first communication network and a second service level intent for communications of the second communication network, a service level intent including an indication of a minimum service level; and determine a radio resource partition, RRP, between the communications of the first communication network and the communications of the second communication network based at least in part on the comparison, the RRP determined based in part on a priority intent received from an intent owner module and a RRP ratio configuration parameter.

2. The network node of claim 1, wherein the first intent metric and the second intent metric are based at least in part on a data transfer rate.

3. The network node of claim 1, wherein the performance measurements are performed by a scheduler.

4. The network node of claim 1, wherein the first and second service level intents are based at least in part on target values from a network operator.

5. The network node of claim 1, wherein the processing circuitry is further configured to cause transmission of an indication of available intent metrics to the intent owner module and to receive the first and second service level intents.

6. The network node of claim 1, wherein the quality of experience of users of the first communication network and the quality of experience of users of the second communication network are based at least in part on a downlink throughput for the first communication network users and the second communication network users, respectively.

7. The network node of claim 1, wherein the processing circuitry is further configured to send a reconfiguration signal to an RRP unit configured to change a partition between resources for communications of the first communication network and resources for communications of the second communication network.

8. The network node of claim 1, wherein a service level intent includes at least one of a throughput target, an energy consumption limit and packet latency bounds.

9. The network node of claim 1, wherein at least one of the intent metrics includes at least one of an average downlink throughput, an uplink throughput, a worst user downlink throughput and a packet latency.

10. The network node of claim 1, wherein the first communication network is a mobile broadband, MBB, communication network and the second communication network is one of a fixed wireless access, FWA, communication network and an Internet of Things, IoT, communication network.

11. A method implemented in a network node that is configured to communicate with a wireless device, the method comprising:

determining at least a first intent metric and a second intent metric based at least in part on performance measurements, the first intent metric being indicative of a quality of experience of users of the first communication network and the second intent metric being indicative of a quality of experience of users of the second communication network;

comparing the first intent metric and the second intent metric to respective ones of a first service level intent for communications of the first communication network and a second service level intent for communications of the second communication network, a service level intent including an indication of a minimum service level; and determining a radio resource partition, RRP, between the communications of the first communication network and communications of the second communication network based at least in part on the comparison, the RRP determined based in part on a priority intent received from an intent owner module and a RRP ratio configuration parameter.

12. The method of claim 11, wherein the first intent metric and the second intent metric are based at least in part on a data transfer rate.

13. The method of claim 11, wherein the performance measurements are performed by a scheduler.

14. The method of claim 11, wherein the first and second service level intents are based at least in part on target values from a network operator.

15. The method of claim 11, further comprising transmitting an indication of available intent metrics to the intent owner module and receiving the first and second service level intents.

16. The method of claim 11, wherein the quality of experience of users of the first communication network and the quality of experience of users of the second communication network are based at least in part on a downlink throughput for the first communication network users and the second communication network users, respectively.

17. The method of claim 11, wherein the process also includes sending a reconfiguration signal to an RRP unit configured to change a partition between resources for communications of the first communication network and resources for communications of the second communication network.

18. The method of claim 11, wherein a service level intent includes at least one of a throughput target, an energy consumption limit and packet latency bounds.

19. The method of claim 11, wherein at least one of the intent metrics includes at least one of an average downlink throughput, an uplink throughput, a worst user downlink throughput and a packet latency.

20. The method of claim 11, wherein the first communication network is a mobile broadband, MBB, communication network and the second communication network is one of a fixed wireless access, FWA, communication network and an Internet of Things, IoT, communication network.

\* \* \* \* \*